United States Patent [19]

Wozar

[11] 4,129,400
[45] Dec. 12, 1978

[54] TREPANNING TOOL

[76] Inventor: Tiberius M. Wozar, Waldackerweg 5, 7300 Esslinger-Wiflingshausen, Fed. Rep. of Germany

[21] Appl. No.: 744,269

[22] Filed: Nov. 23, 1976

[30] Foreign Application Priority Data

Nov. 26, 1975 [DE] Fed. Rep. of Germany ....... 2553035
Oct. 29, 1976 [DE] Fed. Rep. of Germany ....... 2649399

[51] Int. Cl.² .................. B23B 51/06; B23B 41/02
[52] U.S. Cl. ............................... 408/56; 408/96; 408/206; 408/703; 408/713
[58] Field of Search ............... 408/57, 59, 68, 96, 408/206, 225, 233, 703, 713, 56, 61; 279/20

[56] References Cited

U.S. PATENT DOCUMENTS

| 558,583 | 4/1896 | Felton | 408/68 X |
| 765,877 | 7/1904 | Brownstein | 408/56 |
| 3,825,362 | 7/1974 | Hougen | 408/68 |

FOREIGN PATENT DOCUMENTS 1213598  11/1970  United Kingdom ............. 408/206

Primary Examiner—Othell M. Simpson
Attorney, Agent, or Firm—Watson, Cole, Grindle & Watson

[57] ABSTRACT

A tool for removing a disk or cylindrical core from a workpiece which includes a shank, an extension piece and cutting elements, the extension piece being in the form of a hollow cylinder and including apertures in the wall thereof for the introduction therein of a coolant. An axially movable centering element is positioned with the extension piece, the centering element including a centering spigot which fits into a cup-shaped centering piston, plate springs within the piston and against which the centering spigot is movable, and an elastic ring therearound for contact against the inner wall of the hollow cylinder. Upon positioning of the tool onto a workpiece and consequently the centering spigot at the center of the core to be cut, and upon application of axial movement of the tool towards the workpiece, the centering spigot is axially movable within the piston in a fashion to provide a constantly increasing resistive force up to a point wherein the elastic ring releases its resistive contact against the inner wall of the hollow cylinder and the piston itself axially moves within the hollow cylinder. The resistive force of the centering spigot then becomes constant, based on the force exerted on the piston resulting from the introduction of coolant into the hollow cylinder. Multiple extension pieces of varying lengths can be utilized, or none can be used, provided the shank is of the form of a hollow cylinder.

12 Claims, 8 Drawing Figures

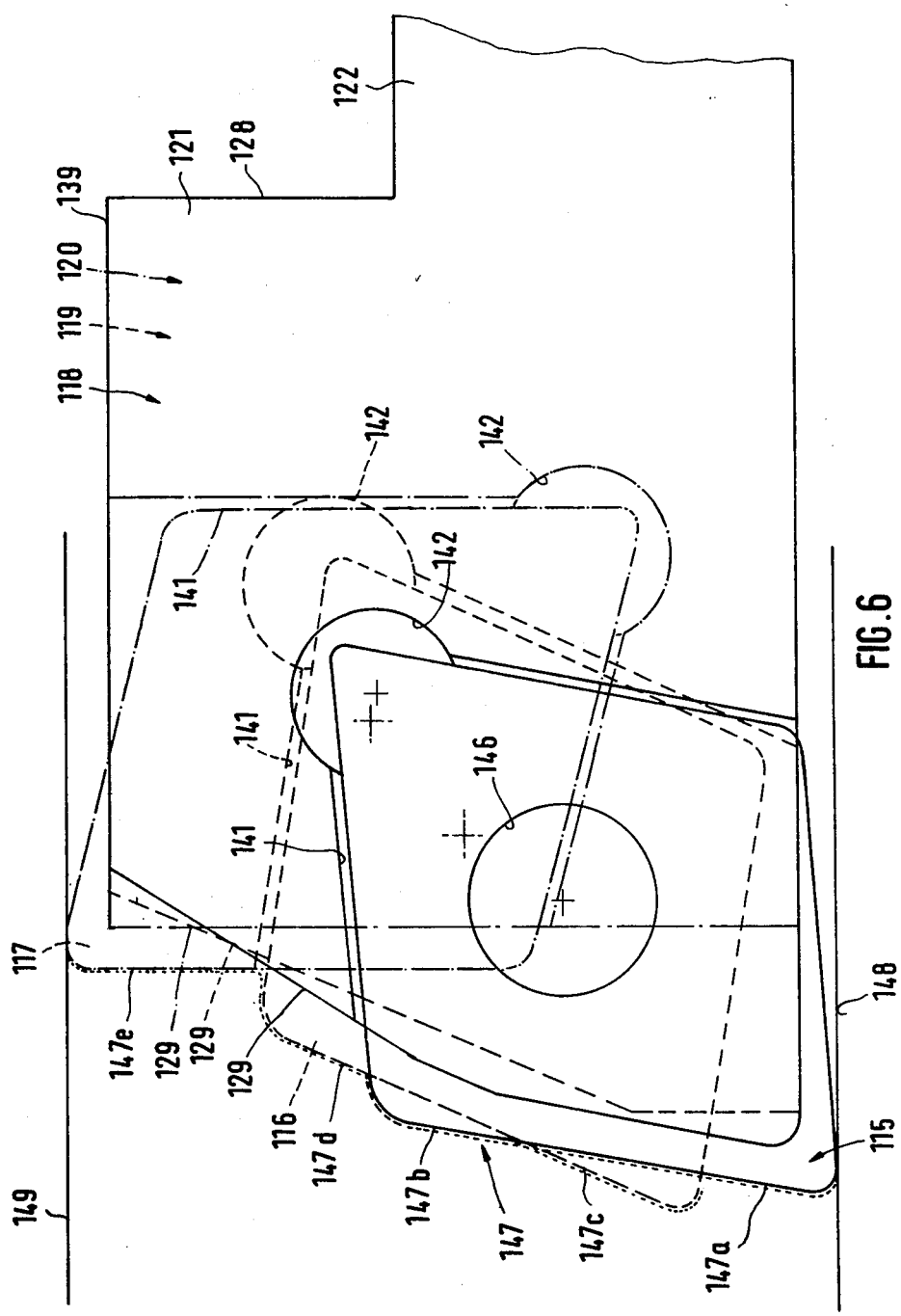

TREPANNING TOOL

BACKGROUND AND FIELD OF THE INVENTION

The present invention relates to a trepanning tool with a shank made at least in part as a hollow body and preferably provided with a coolant aperture, with cutting elements and with an axially movable guide or centering element in the boring axis.

A first object of the present invention is to produce a trepanning tool of the type mentioned above which avoids the disadvantages of known tools of this kind and in which it is possible to start a cut without being dependent on the existing coolant pressure and while being subjected to an increased axial preload.

SUMMARY OF THE INVENTION

According to the present invention, the centering element is located movably in an axial direction such that it is subjected to an axial compressive load which preferably increases roughly progressively while starting to cut a core hole and thereafter subjected to a largely constant compressive load preferably by means of the coolant.

In this way the axial preload of the centering element can be made dependent on the various forces which occur when starting the cut and in the course of further boring and in particular one can obtain the increased preload which is required when starting the cut. The increased preload necessitates improved accuracy because the adjusted axial preload does not allow the tool to deflect and thus the centering is equally good at all times.

A simpler design results when the centering element has a centering spigot which is located movably in an axial direction in a guide piston against the action of one or several springs, preferably plate springs, and when the guide piston within a hollow body on the shank is movable in an axial direction after overcoming a stop or a pressure point. Depending on the quantity, arrangement, and design of the plate springs the initial compressive load can thus be made to depend in various ways on the traverse or on the boring depth. The subsequent constant compressive load is dependent on the coolant pressure used. As a matter of expediency the guide piston is provided with at least one coolant channel the diameter of which may be greater or smaller according to the feed speed and the amount of coolant required. Particularly in view of the constant pressure which is maintained after the starting cut, it is also advantageous for the coolant channel to have an orifice at its end facing the boring head. This nozzle contributes to the determination of the axial preload and its cross-section can if necessary be made variable.

A further object of the present invention is to produce a tool of the type specified above with which deep or long holes can be made and where the depth or length of the holes can be varied. For this purpose, the trepanning tool is designed to consist of more than two detachable parts connected together, namely a shank, an extension piece made as a hollow body in which the centering element is located, and a set of cutting elements. The cutting elements can thus be attached directly to the shank — the shortest possible design — or they may be attached to form an integral tool by interposing the extension piece to suit the boring length required. Extension pieces of various lengths may also be used and in this way one can obtain tools of various lengths to suit the requirements.

Depending on the application, the cutting elements may be of different shapes and attached to the extension piece.

In one form of construction the cutting elements are triangular-shaped or rhomboid-shaped turnplates which are attached to the extension piece or to the boring head. It is expedient to incorporate 2 × 3 turnplates of which each pair are diametrically opposite to each other. The ring-shaped cutting width is thus divided into several segments and thus several narrow chips are removed when boring. Machining is facilitated in this way because the force expenditure with respect to torque and feed is less. Furthermore, the chips are small and thus chip removal is also improved.

In order to avoid unsteady working of the tool, the turnplates are arranged at unequal intervals over the periphery of the boring head since resonant vibrations are thereby avoided. The irregular spacing can be selected optionally, whereby the preferred design is such that the angular spacing increases in the opposite direction to rotation, for example from 55° to 60° to 65° for each set consisting of three turnplates, the last-named angle representing the spacing between the two sets.

In another form of construction, each cutting element is held on a cutter holder and the cutter holders are arranged singly at the front end of the extension piece. By making only the individual cutter holders interchangeable instead of making the boring heads interchangeable, the tool is made considerably less expensive because it is considerably easier to manufacture these tool holders. Furthermore, the cutter holders can be used to a certain extent for several diameters of the holes to be produced. If the cutter is damaged, it is generally sufficient to replace single cutting elements or in the worst case the single cutter holder while the others can be left. Furthermore there are numerous combination possibilities with regard to the arrangement of the individual cutter holders. The interchangeability of at least a part of the cutter holders between themselves makes low stocking possible. Furthermore materials with maximum strength can be used for the cutter holders without this making the tool considerably more expensive. A further acvantage is that the removed chips can be removed much better and more freely because there is a free gap between the various cutter holders. Previously this free space had been taken up by the areas of the boring head between the cutting elements. Since the cutter holder is located directly on the tube-shaped or hollow cylindrical shank, the chips can glide easily and directly over the external periphery of the hollow shank and be removed. Another important point is that the cutting elements centre by means of a specific arrangement of the tool that is easy to bring about and that they can be attached very rigidly to the shank and thus high performance is possible.

Further details and arrangements of the present invention are given in the following description in which the present invention is described in more detail and explained with reference to the forms of construction shown in the drawing.

DETAILED DESCRIPTION OF THE PREFERRED EMBODIMENTS

Figure 1:
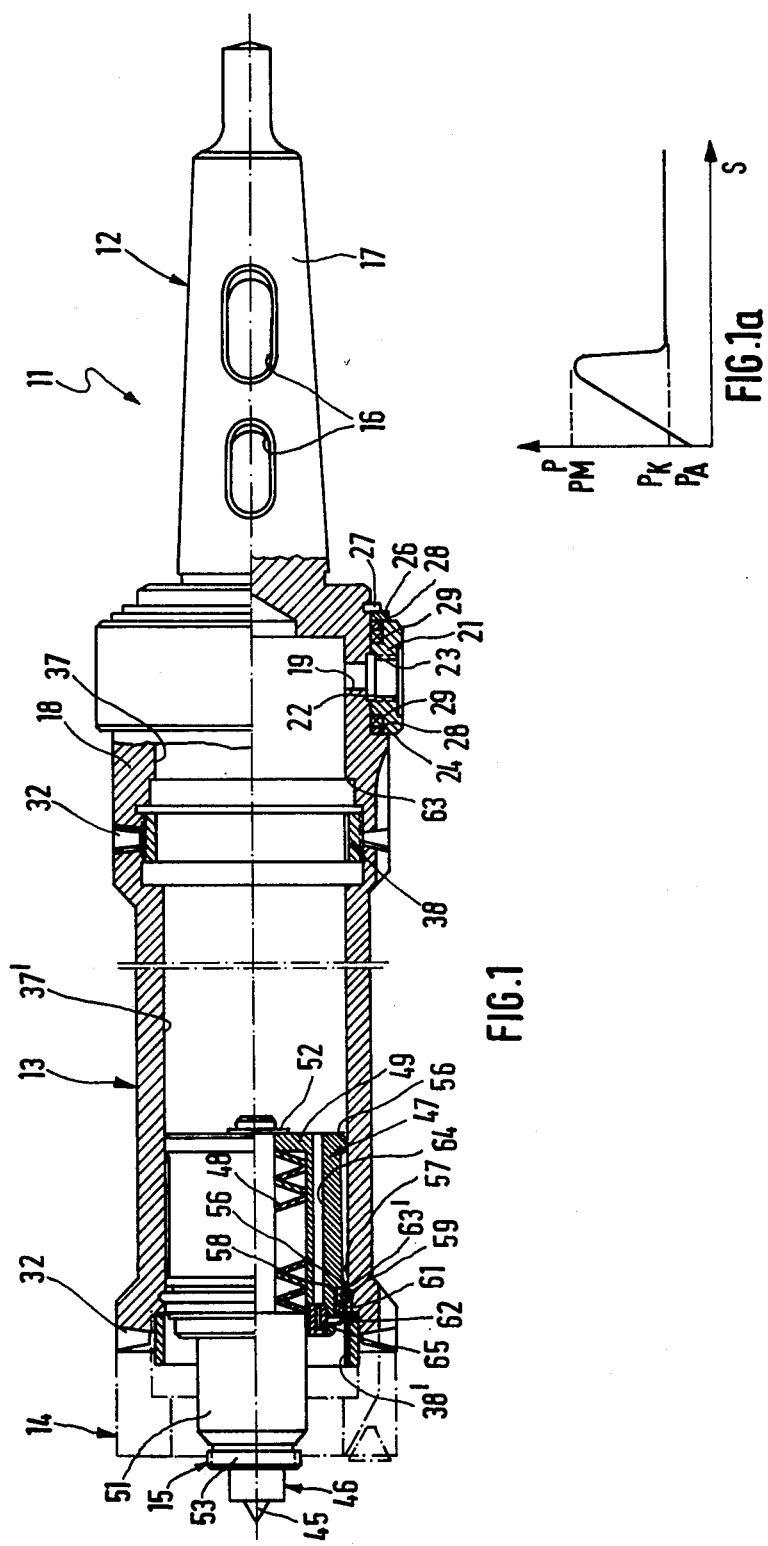
FIG. 1 a longitudinal partial sectional view of a tool for boring core holes in accordance with a first form of construction of the present invention, FIG. 1a the pressure exerted by the centering operation on a workpiece during boring related to the traverse in qualitative graphical representation, FIG. 2 a front view of the tool head in the direction of the tool access, FIG. 3 a longitudinal section through a part of a trepanning tool shaft in accordance with a second form of construction of the present invention, FIG. 4 a front view in the direction of arrow VI in FIG. 3, FIGS. 5a, 5b a rearward front view or a plan view on a cutter holder used with the trepanning tool and FIG. 6 an enlarged schematic superimposed representation of the arrangement and the positions of the various cutting elements used relative to each other.
Figure 2:
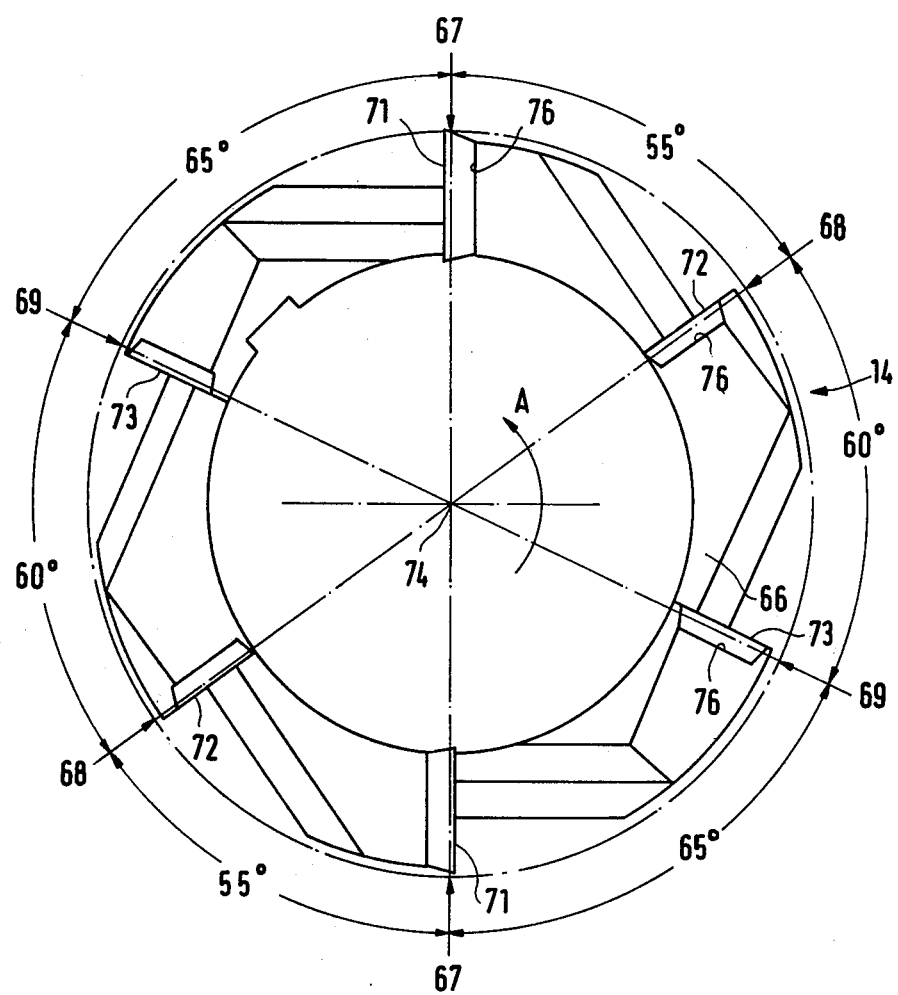
Figure 3:
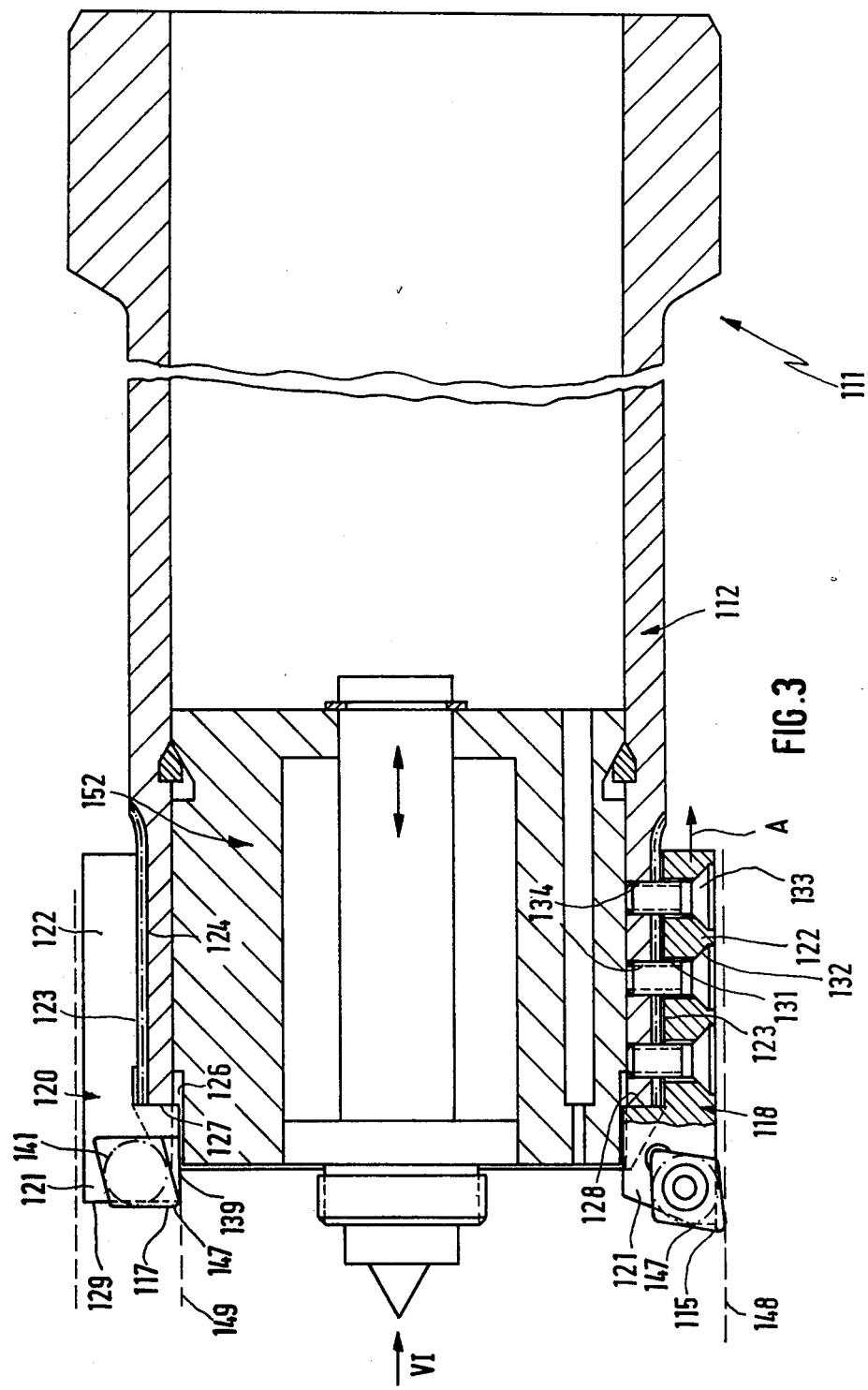

A tool 11 shown in FIGS. 1 and 2 for drilling core holes according to the first form of construction is composed of three parts, these being a shank 12 which can be mounted in a boring jig which is not shown, an extension piece 13, and a tool head in the form of a boring head 14. The design of the tool 11 is such that in the same manner in each case either the boring head 14 can be mounted or attached to the shaft 12 or the extension piece 13 to which the boring head 14 can be mounted or attached, again in the same manner. Extension pieces 13 of various lengths can also be used, depending on the depth or the length required for the hole to be produced in the workpiece in question. The boring head 14 can be replaced by another tool head such as a reaming head, a rolling head or similar device so that the hole produced by the boring head 14 can be finish machined to provide the required quality of the inside wall. Within the boring head 14 there is a centering element 15 which is fitted in an axially movable position either in the front end of the shaft 12 or in the extension piece 13.

The shank 12 is selected to suit the machine tool being used, e.g., Morse taper, steep angle taper, or cylindrical shank. Adjacent to the conical end 17 of the form of construction shown in the drawing, there is a hollow cylindrical part 18 that contains one or several radially stepped holes 19. In the region of the radial holes 19, the hollow cylindrical part 18 is surrounded by a coolant supply ring 21 which has roughly in the middle an inner channel type annular groove 22 which forms a closed annular channel with the extension of the stepped hole 19 and in which a tapped hole 23 leads in at one or several places to which a tube or such like can be screwed in for the supply of coolant. The coolant may be a liquid medium, such as oil or soluble oil emulsion or such like, or a gasous medium such as air. The permanently located supply ring 21 about which the coaxial shank 12 rotates when in operation bears against an annular shoulder 24 on the hollow cylindrical part 18 and is held by means of a check flange 26 and a safety ring 27 to its end facing the annular shoulder 24 and sealed in both directions by packing rings 28, 29.

In order to provide a detachable connection at the face ends opposing each other, the extension piece 13, the shaft 12, and the tool head 14 each have Hirth-type serrations 32 which provide the rotary joint. For axially connecting the individual elements 12, 13, 14 together, tightening collets 38, 38' of identical design are provided through which the Hirth-type serrations 32 are held against each other and which have a right-hand and left-hand thread for screwing together with the extension piece 13 and the shank 12 or the tool head 14.

The centering element 15 which is located movably in an axial direction in the extension piece 13 has a centering spigot 46 projecting beyond the tool head 14 with a tip 45, and is located movably in an axial direction in a cup-shaped centering piston 47. Within the centering piston 47 there are numerous plate springs 48 arranged axially adjacent to or one above each other which are supported on the base 49 of piston 47 on the one side and on a shoulder 51 on the centering spigot 46 on the other side. The end of the centering spigot 46 facing away from the tip 45 projects through the base 49 of the piston 47 and is held there axially by means of a retaining ring 52 under the compressive action of the plate springs 48. A threaded part 53 is provided between shoulder 51 and the front end of the spigot 46 to allow manipulation with a tool. The cup-shaped centering piston 47 has a guide shoulder 56 at its rear end and another in the region of its front end, the guide shoulder having six equally distributed axial grooves 57 on its periphery, and it glides on the inner wall 37' or 37 of the extension piece 13 or of shaft 12 depending in which hollow body of the centering element 15 it is fitted. At its front end, the centering piston 47 has a step 58 over which an elastic ring 59 is pushed with radial play and which is held axially on the one side by a retainer ring 62 through a stop collar 61 and against the shoulder 56 on the other side. The collar 59 projects beyond the external surface of the shoulder 56 and in its normal position it rests against a surface 63' or 63 that tapers conically inwards on the extension piece 13 or on the shank 12. The centering piston 47 also has one or several axial holes 64 or grooves arranged around its periphery to allow the coolant to pass through, the hole or holes having an orifice 65 on their inlet facing the boring head 14.

When performing a trepanning operation, the tool 11 is placed on the workpiece, the centering spigot 46 being placed with its tip 45 in a previously punched or drilled centering mark. The tool 11 is then moved towards the workpiece until the boring head 14 starts the cut on the workpiece; during this operation, the centering spigot 46 has moved somewhat into the centering piston 47 against the action of the plate springs 48. The plate springs 48 are designed such that the pressure p exerted by the centering spigot 46 on the workpiece increases progressively with its displacement s as shown qualitatively by the graphical representation in FIG. 1a. In this way, the centering element 15 exerts a certain pressure on the workpiece when starting the cut, i.e., at the beginning of the boring operation, and thus reliable centering is assured immediately. During the starting cut, the centering spigot is first pushed even further inwards against the action of the plate springs 48, while the pressure increases progressively up to a maximum value $P_M$. It is possible to shift the centering piston 47 within the extension piece 13 or within the hollow cylindrical part 18 of the shaft 12 after overcoming a stop or a pressure point only after this maximum pressure $P_M$ has been reached, and this shift is effected by the elastic ring 59 being pressed beyond the conical surface 63 or 63' between the step 48 of the centering piston 47 and the inner wall 37 or 37' of the respective hollow body. This point is reached after the starting cut, that is, at a time at which no preload forces of such magnitude are any longer necessary for reliable centering. Since the elastic ring 59 can now glide on the inner wall 37, 37' of the respective hollow body and the centering piston 47 moves against the pressure $P_K$ of the coolant, this pressure being less than the force exerted by the compressed plate springs 48, the preload reduces almost to the initial value $P_A$ and also remains constant during the entire boring operation because of the constant pressure in the coolant supply. The counter pressure on the centering element could also be produced by a suitably designed spring or such like in addition to or instead of the coolant.

As shown in FIG. 2, the boring head 14 is provided with six cutting plates in the form of 2 × 3 turnplates 67, 68, 69 on its end surface 66 facing away from the Hirth-type serrations 32, each pair of turnplates being located diametrically opposite to each other. One set of turnplates 67, 68, 69 is arranged in sequence through 180° in the direction opposite to the direction of rotation A and this is followed by another set of turnplates 67, 68, 69 in the same order. The angular spacing of the turnplates over the ring-shaped end face 66 of the boring head 14 is irregular, and in this form of construction there is an angle of 55° between the turnplates 67 and 68, an angle of 60° between the turnplates 68 and 69, and an angle of 65° between the turnplate 69 of one set and the following turnplate 67 of the other set. The turnplates 67, 68, 69 have the same geometrical basic shape, namely that of a virtually equilateral triangle with rounded corners, and their cutting edges 71, 72, 73, which are inclined at different angles to the normal through the tool axis produce narrow annular surfaces and thus small chips; they are fastened in virtually identically shaped recesses 76, have a relief angle of about 4°, and their surfaces are inclined at an angle of about 6° to the tool axis 74 (rake angle). The main turnplate 67 has a cutting edge length corresponding to the width of the ring to be bored out of the core hole, whereas the equally wide secondary turnplates 68, 69 are narrower.

Of the trepanning tool 111 shown in FIGS. 3 to 6 according to a second form of construction of the present invention, only a hollow cylindrical shank part 112 is shown which can be connected detachably with another tool shank that can be fitted into the spindle of a machine tool. The shank part 112 is, for example, an extension piece with which the tool 111 can be adapted to suit various depths of boring holes to be produced. The extension or the shank part 112 can also in this case be of different length and can also in accordance with the present invention be adapted to suit various diameters of core holes to be produced by stocking hollow cylindrical shaft parts 112 with different diameters, for example, diameters which increase or decrease in size by steps, and these parts being used or fitted to the tool shank accordingly. The centering element 152 corresponds to the centering element 15 shown in the first form of construction. The detachable connection between the shaft part or parts 112 and the tool shank which is not shown can also be accomplished as in the first form of construction or in another suitable manner.

Figure 4:
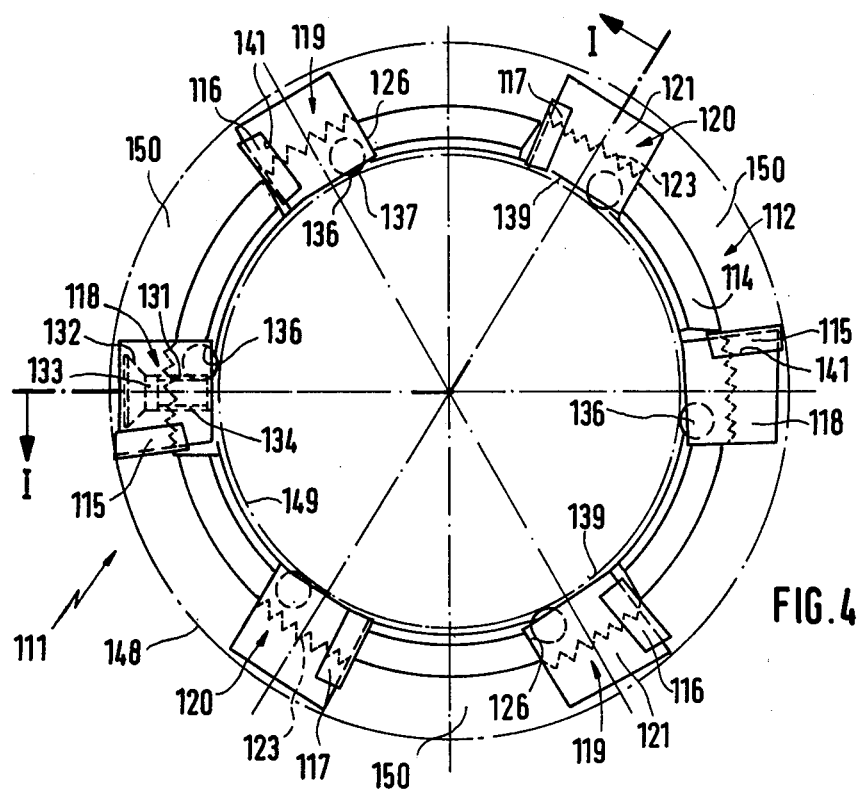
Figure 5B:
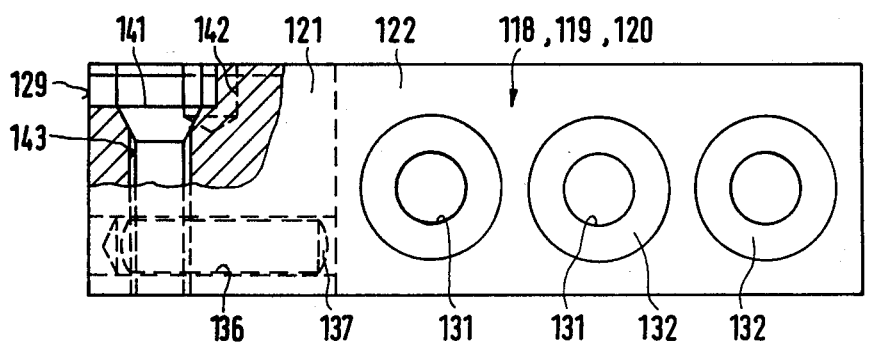
Figure 5A:
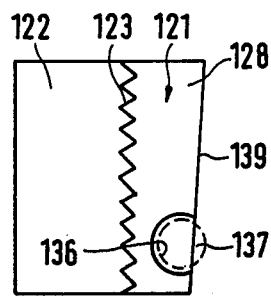

As can be seen from FIG. 4 in particular, the shank part 112 contains distributed over its ring-shaped end face 114 six cutting elements 115, 116 and 117 of which two elements occupying the same position in each case are arranged opposite to each other. As in the form of construction, each pair of cutting elements may be of the same shape. Each of the cutting elements 115, 116, 117 is attached to a cutter holder 118, 119 and 120, respectively, of roughly quadrangular shape viewed longitudinally and which is detachably mounted to the external periphery of shank part 112. It is thus possible to replace a cutter holder by another if this should be necessary.

In essence, each cutter holder 118, 119, 120 consists of a head 121 to which the relevant cutting element 115, 116, 117 is attached, preferably screwed on, and of a collar 122 by means of which the cutter holder 118, 119, 120 can be attached to the shank part 112. On its lower side, the collar 122 has a serration running in a longitudinal direction or a wavy groove 123 with which it can engage in a corresponding serration running in an axial direction or wavy groove on the periphery of the shank part 112. The serration or groove on the shank part 112 is contained on a flat 124 running in an axial direction to which the cutter holder 119 and its collar part 122 is mounted such that it can be supported positively in a radial direction on the shaft part 112 during the cutting operation. The axial flat 124 extends towards the end face 114 of the shaft part 112 into a recess 126 which penetrates the entire thickness or width of the end face 114 and in which the head 121 of the cutter holder is inserted from the front and held. The base of the recess 126 represents a mounting surface 127 against which a stepped surface 128 rests snugly at the transition point between head 121 and collar 122 of the cutter holder 119 in the fitted condition. The cutter holder 118, 119, 120 is held in the shank part 112 in such a way that the inner surface of the head 121 forms essentially an approximate tangent to the inner boundary of the shank part 112 and in which the head 121 with the associated cutting element 115, 116, 117 projects beyond the end face 114 of the shank part 112. The collar 122 has three holes 131 arranged one behind the other in a longitudinal direction provided with a centering cone 123 and into which the fastening screws 133 can be inserted and screwed into tapped holes 134 in the shank part 112. The cutter holder 118, 119, 120 can be fastened to the shank part 112 by means of the fastening screws 133 such that the cutter holder is shifted in an axial direction as shown by arrow A during tightening of the screws until the stepped surface 128 of the head 121 rests against the mounting surface 127 of the shank part 112, preferably with preloading. This is accomplished by the holes in the cutter holders being displaced in an axial direction with respect to the fastening threads such that they draw the cutter holder towards the machine spindle in the direction of arrow A (in the direction of the feed forces) when the screws are tightened. In this way it is ensured that the cutting pressure and the feed pressure are transferred or transmitted directly to the shank part 112. Furthermore, a blind borehole 136 (FIG. 5) is arranged on head 121 and accessible in an axial direction from the stepped surface 128, this hole being cut from the inside surface 139 of the head and into which a locking pin 134 can be inserted which protrudes from the blind borehole 136 and the inside surface 139 and which when fitted penetrates into a hole in the end face 114 of the shank part 112. The pin 137 is held in the hole. Its sole purpose is to prevent damage to the cutting edge.

The head 121 of each cutter holder 118, 119, 120 contains on the surface directed radially in the installed position and at the front viewed in the cutting direction a recess 141 which is open at the free end and extending longitudinally and intended for the cutter holder, which at its inner corner goes into a blind borehole 142 cut from the recess. The individual recesses each assume another relative position on the cutter holder 118, 119, 120 in accordance with the location provided for the cutting elements 115, 116, 117. The approximately rhomboid-shaped cutting elements 115, 116, 117 are attached to the cutter holder 119 in a tapped hole 143 running from the recess 141 in a peripheral direction and held in such a way that their cutting edge 147 projects beyond the end face 129 of head 121 extending at an angle towards the inside in the direction of the tool longitudinal axis or vertically to it.

The identically shaped cutting elements 114, 116, 117 are arranged on their associated cutter holders 118, 119, 120 in such a way, as shown especially in FIG. 6, that three pairs of cutting elements result whereby the elements of each pair are arranged similarly and are located diametrically opposite to each other. The individual pairs of cutting elements are arranged with the outer or inner corners of their cutting edges 147 projecting by different amounts radially outwards or inwards. The outer corners of the cutting edges 147 of the outer cutting elements 115 are located on an outside circle 148 and determine the maximum boring diameter of the workpiece, and these corners project beyond the outer periphery of the cutter holders 118, 119, 120. The inner corners of the cutting edges 147 of the inner cutting elements 117 are arranged towards the inside to such an extent that they are located on an inner circle 149 and determine the inside of the boring hole of the workpiece or the outside diameter of the core to be bored out of the workpiece and project beyond the inside periphery of the shank part 112. The cutter elements 116 are located in between and their purpose is to separate chips in a manner yet to be described.

As shown in FIG. 6, the pairs of cutting elements 115, 116, 117 are arranged such that the outer and middle cutting elements 115, 116, each remove two ring-shaped chips and the inner cutting elements 117 each remove only one single ring-shaped chip during the machining operation. This means that the outer and inner cutting elements 115, 116 are arranged relatively to each other in such a manner that the cutter region 147c of the middle cutting element 116 (shown by a broken line) divides the cutting edge 147 of the outer cutting element 115 (shown in unbroken lines) into two cutter regions 147a and 147b, while the cutter region 147b of the outer cutting element 115 divides the cutting edge 147 of the middle cutting element 116 into the two cutting regions 147c and 147d. Furthermore, the middle cutting element 116 makes the chip of the inner cutting element 117 (shown by a dot-dash line) narrower. The entire effective cutting edge is shown by a dotted envelope. This has the advantage of more (in this case 5) narrow chips being produced instead of, for example, only three wide chips during machining. This in turn has a positive effect on the torque which is to be applied. As already mentioned, three times two cutting elements or cutter holders are arranged on the front of the shank part 112. The angular arrangement or spacing of the cutter holder 118, 119, 120 over the end face 114 of the shank part 112 is designed similarly to the first form of construction in such a way that there is an angle of 65° between the cutter holder 118 equipped with the outer cutting elements 115 and the cutter holder 119 equipped with the middle cutting element 116, an angle of 55° between the latter and the following cutter holder 120 equipped with the inner cutting element 117, and an angle of 60° between the latter and the following cutter holder 118 equipped with the outer cutter element 115. Clearly, the angular spacing can also be different from that described here.

The particular advantage of this second form of construction is that, apart from the simple replaceability of the cutter holders 118, 119, 120 or of the associated cutting elements 115, 116, 117, the cutter holders can be mounted and fastened to various hollow cylindrical shank parts 112, these cutter holders differing not only in length but also in their outer diameters, so that wide ranges of diameters of core holes to be bored can be covered by one and the same set of cutting elements 115, 116, and 117 and cutter holders 118, 119 and 120, respectively. This also means that stocking is simpler and less costly. Furthermore, between the individual cutter holders 118, 119, 120 there is a gap 150 in each case through which the chips can be removed simply and directly.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A trepanning tool which includes
   an elongated shank, at least one end of which is formed by a hollow body, and which defines a central boring axis;
   cutting elements connected to the end of said elongated shank formed by said hollow body;
   a centering element axially movably positioned within said hollow body portion of said elongated shank, said centering element including a guide piston, a centering spigot, and springs positioned between said centering element and said guide piston such that said centering spigot is relatively movable with respect to said guide piston; and
   means provided in said hollow body portion of said elongated shank forming a radial aperture therein for allowing coolant medium into said hollow body portion and act to resist axial movement of said centering element when said trepanning tool is used and said centering element is subjected to axial compressive loads due to the tool being placed against a workpiece to be bored.

2. The tool of claim 1 wherein said guide piston is cup-shaped and has a diameter which is smaller than the diameter defined by the inner surface of said hollow body portion of said elongated shank, and wherein an elastically deformable ring is connected to an outer surface of said cup-shaped guide piston to rest against said inner surface of said hollow body portion of said elongated shank and thus tend to fix said guide piston in position within said hollow body portion when the centering element thereof is subjected to small axial compressive loads.

3. The tool of claim 2 wherein said cup-shaped guide piston includes means forming at least one axially directed channel with an inlet end adjacent the follow body portion of said elongated shank and an outlet to the atmosphere, each channel allowing coolant to escape from the hollow body portion of said elongated shank.

4. The tool of claim 3 wherein each of said at least one axially directed channel includes means forming an orifice at its outlet end.

5. A trepanning tool which includes an elongated shank, at least one end of which is formed by a hollow body, and which defines a central boring axis;

a hollow extension piece, one end of which is connected to the end of said elongated shank formed by said hollow body;

cutting elements connected to the end of said hollow extension piece opposite said shank; a centering element axially movably positioned within said hollow body portion of said elongated shank, said centering element including a guide piston, a centering spigot, and springs positioned between said centering element and said guide piston such that said centering spigot is relatively movable with respect to said guide piston; and means provided in said hollow body portion of said elongated shank forming a radial aperture therein for allowing coolant medium into said hollow body portion and said hollow extension piece and act to resist axial movement of said centering element when said trepanning tool is used and said centering element is subjected to axial compressive loads due to the tool being placed against a workpiece to be bored.

6. The tool of claim 5 wherein said guide piston is cup-shaped and has a diameter which is smaller than the diameter defined by the inner surface of said hollow extension piece, and wherein an elastically deformable ring is connected to an outer surface of said hollow extension piece and thus tend to fix said guide piston in position within said hollow extension piece when the centering element thereof is subjected to small axial compressive loads.

7. The tool of claim 6 wherein said cup-shaped guide piston includes means forming at least one axially directed channel with an inlet end adjacent the coolant medium-containing portion of said hollow extension piece and an outlet to the atmosphere, each channel allowing coolant to escape from the coolant medium-containing portion of said hollow extension piece.

8. The tool of claim 7 wherein each of said at least one axially directed channel includes means forming an orifice at its outlet end.

9. The tool of claim 5 wherein said cutting elements each comprise triangular-shaped turnplates.

10. The tool of claim 9 wherein each cutting element is connected to a cutter holder and wherein each cutter holder is sequentially positioned on the hollow extension piece opposite said shank.

11. The tool of claim 10 wherein said cutter holders are attached to an external periphery of said hollow extension piece and wherein they are held by means of a serration and flat extending in the axial direction.

12. The tool of claim 10 wherein said cutting elements are arranged on said tool holders such that two outer, two middle and two inner cutting edges are produced in relation to the bore to be cut, the cutting edges of the two outer and middle cutting elements being such as to produce two ring-shaped chips in each case and the cutting edges of the inner cutting elements being such as to produce one ring-shaped chip when said tool is used to bore into a workpiece.

* * * * *